(12) United States Patent
Jenkins (10) Patent No.: US 10,793,046 B1
(45) Date of Patent: Oct. 6, 2020

(54) RACK AND PINION LIFT FOR A TAILGATE

(71) Applicant: Jayson Jenkins, Columbia, SC (US)

(72) Inventor: Jayson Jenkins, Columbia, SC (US)

(*) Notice: Subject to any disclaimer, the term of this patent is extended or adjusted under 35 U.S.C. 154(b) by 0 days.

(21) Appl. No.: 16/299,259

(22) Filed: Mar. 12, 2019

(51) Int. Cl.
*B60P 1/44* (2006.01)

(52) U.S. Cl.
CPC .......... *B60P 1/4485* (2013.01); *B60P 1/4471* (2013.01); *B60P 1/4492* (2013.01)

(58) Field of Classification Search
CPC ..... B60P 1/4421; B60P 1/4471; B60P 1/4485; B60P 1/4492; B60P 1/003; B60P 1/022; B60P 1/4414; B60P 1/44; F16H 19/04; B65G 67/04; B65G 67/24
USPC .................. 414/462, 557, 545, 556; 269/51; 254/6 R
See application file for complete search history.

(56) References Cited

U.S. PATENT DOCUMENTS

| | | | |
|---|---|---|---|
| 2,696,923 A | 12/1954 | Messick | |
| 3,185,322 A * | 5/1965 | Matthews | B60P 1/4421 414/545 |
| 3,305,112 A | 2/1967 | Delbert | |
| 3,688,649 A | 9/1972 | Hostetler | |
| 4,813,842 A | 3/1989 | Morton | |
| 5,641,262 A | 6/1997 | Dunlop | |
| 6,581,910 B1 * | 6/2003 | Granata | B66F 7/02 254/105 |
| 7,806,647 B2 * | 10/2010 | Gomes | B60P 1/4471 414/545 |
| 8,973,898 B2 * | 3/2015 | Hurd | A47B 97/00 254/2 R |
| 9,403,469 B2 | 8/2016 | Parker | |
| 9,545,958 B1 | 1/2017 | Marchlewski | |
| 9,616,796 B2 * | 4/2017 | Russo | B60P 1/4485 |
| 9,649,969 B1 | 5/2017 | Leurck | |
| 9,889,786 B1 * | 2/2018 | Stojkovic | B60P 1/4407 |
| 2002/0197142 A1 * | 12/2002 | Anderson | B60P 1/44 414/557 |
| 2007/0065262 A1 | 2/2007 | Murphy | |
| 2012/0073392 A1 * | 3/2012 | Balc | B25B 5/061 74/29 |

FOREIGN PATENT DOCUMENTS

WO 2003000519 1/2003

* cited by examiner

*Primary Examiner* — Glenn F Myers (57) ABSTRACT

The rack and pinion lift for a tailgate is configured for use with a pickup truck. The rack and pinion lift for a tailgate is a moving platform. The rack and pinion lift for a tailgate is configured for use as a cargo lift. Specifically, the moving platform formed by the rack and pinion lift for a tailgate: a) raises and lowers cargo between the ground and an elevation that is roughly level with the bed of the pickup truck. The rack and pinion lift for a tailgate comprises a port structure, a starboard platform, and a loading platform. The port structure mounts on the tailgate. The starboard structure mounts on the tailgate. The loading platform attaches to the port structure and the starboard structure. The port structure and the starboard structure vertically raise and lower the loading platform.

17 Claims, 10 Drawing Sheets

RACK AND PINION LIFT FOR A TAILGATE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including vehicles adapted for use with a load, more specifically, a vehicle adapted to facilitate the loading of the vehicle using a loading platform that remains horizontal while loading and unloading cargo. (B60P1/4414)

SUMMARY OF INVENTION

The rack and pinion lift for a tailgate is configured for use with a pickup truck. The pickup truck further comprises a bed, a tailgate, a port sidewall, and a starboard sidewall. The pickup truck is further defined with a primary sense of direction. The rack and pinion lift for a tailgate is a moving platform. The rack and pinion lift for a tailgate is configured for use as a cargo lift. Specifically, the moving platform formed by the rack and pinion lift for a tailgate: a) raises cargo above the ground to an elevation that is roughly level with the bed of the pickup truck; and, b) lowers cargo from an elevation that is roughly level with the bed of the pickup truck to the ground. The rack and pinion lift for a tailgate comprises a port structure, a starboard platform, and a loading platform. The port structure mounts on the tailgate. The starboard structure mounts on the tailgate. The loading platform attaches to the port structure and the starboard structure. The port structure and the starboard structure vertically raise and lower the loading platform. The cargo is placed on the loading platform.

These together with additional objects, features and advantages of the rack and pinion lift for a tailgate will be readily apparent to those of ordinary skill in the art upon reading the following detailed description of the presently preferred, but nonetheless illustrative, embodiments when taken in conjunction with the accompanying drawings.

In this respect, before explaining the current embodiments of the rack and pinion lift for a tailgate in detail, it is to be understood that the rack and pinion lift for a tailgate is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rack and pinion lift for a tailgate.

It is therefore important that the claims be regarded as including such equivalent construction insofar as they do not depart from the spirit and scope of the rack and pinion lift for a tailgate. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The rack and pinion lift for a tailgate 100 (hereinafter invention) is configured for use with a pickup truck 104. The pickup truck 104 further comprises a bed 131, a tailgate 132, a port sidewall 133, and a starboard sidewall 134. The pickup truck 104 is further defined with a primary sense of direction 135. The invention 100 is a moving platform. The invention 100 is configured for use as a cargo 161 lift. Specifically, the moving platform formed by the invention 100: a) raises cargo 161 above the ground to an elevation that is roughly level with the bed 131 and tailgate 132 of the pickup truck 104; and, b) lowers cargo 161 from an elevation that is roughly level with the bed 131 and the tailgate 132 of the pickup truck 104 to the ground. The invention 100 comprises a port structure 101, a starboard platform, and a loading platform 103. The port structure 101 mounts on the tailgate 132. The starboard structure 102 mounts on the tailgate 132. The loading platform 103 attaches to the port structure 101 and the starboard structure 102. The port structure 101 and the starboard structure 102 vertically raise and lower the loading platform 103. The cargo 161 is placed on the loading platform 103.

The pickup truck 104 is a vehicle. The pickup truck 104 is further defined with an electrical system. The pickup truck 104 is defined in greater detail elsewhere in this disclosure. The primary sense of direction 135 of the pickup truck 104 is defined in greater detail elsewhere in this disclosure.

The bed 131 is a horizontal surface formed in the aft of the pickup truck 104. The bed 131 forms the supporting surface of the pickup truck 104 used to support the cargo 161 during transport. The bed 131 of a pickup truck 104 is well-known and documented in the United States. The tailgate 132 is defined in greater detail elsewhere in this disclosure. The tailgate 132 of a pickup truck 104 is well-known and documented in the United States. The port sidewall 133 is a vertically oriented wall that forms the port side of the cargo 161 containment space formed in the pickup truck 104. The port sidewall 133 of a pickup truck 104 is well-known and documented in the United States. The starboard sidewall 134 is a vertically oriented wall that forms the starboard side of the cargo 161 containment space formed in the pickup truck 104. The starboard sidewall 134 of a pickup truck 104 is well-known and documented in the United States.

The loading platform 103 is a horizontal plate used to raise and lower the cargo 161 during loading. The loading platform 103 is raised and lowered by the port structure 101 and the starboard structure 102. The loading platform 103 rotates relative to the port structure 101 and the starboard structure 102. The load bearing face of the loading platform 103 rotates between a position parallel to the center axes of the port housing 111 of the port structure 101 and the starboard housing 121 of the starboard structure 102 and a position parallel to the center axes of the port housing 111 of the port structure 101 and the starboard housing 121 of the starboard structure 102.

The port structure 101 is a mechanical device. The port structure 101 is an electrically powered device. The port structure 101 draws electrical power from the electrical system of the pickup truck 104. The port structure 101 mounts on the port side of the tailgate 132 of the pickup truck 104. The port structure 101 mounts on the port side of the tailgate 132 such that the port structure 101 is contained within the bed 131 of the closed tailgate 132. The port structure 101 rotates relative to the tailgate 132 between a position parallel to the interior face of the tailgate 132 and a position perpendicular to the interior face of the tailgate 132. The port structure 101 attaches to the loading platform 103. The port structure 101 attaches the loading platform 103 to the tailgate 132. The port structure 101 mechanically raises and lowers the elevation of the port side of the loading platform 103.

The port structure 101 comprises a port housing 111, a port rack and pinion 112, a port motor 113, a port superior hinge 114, and a port inferior hinge 115.

The port housing 111 attaches to the port side of the tailgate 132. The port housing 111 is a prism-shaped structure. The port housing 111 is a hollow structure. The port housing 111 is a rigid casing. The port housing 111 contains port rack and pinion 112. The port housing 111 is formed with all apertures and form factors necessary to port rack and pinion 112 to accommodate the use and operation of the port structure 101. The port motor 113 attaches to the exterior surface of the port housing 111. Methods to form a port housing 111 suitable for the purposes described in this disclosure are well-known and documented in the mechanical arts. The port housing 111 further comprises a port tether 144.

The port rack and pinion 112 is a well-known and documented mechanical structure. The port rack and pinion 112 is contained within the hollow structure formed by the port housing 111. The port rack and pinion 112 is a mechanical device that converts rotational motion into linear motion. The port rack and pinion 112 is configured such that the port rack and pinion 112 converts the rotational energy provided by the port motor 113 into linear motion that raises and lowers the port side of the loading platform 103. The operation of the port rack and pinion 112 is described in a definition provided elsewhere in this disclosure. The port rack and pinion 112 comprises a port rack 141 and a port pinion 142.

The port rack 141 forms the rack portion of the port rack and pinion 112. The port rack 141 is a toothed plate structure. The port rack 141 mounts within the port housing 111 such that the port rack 141 moves within the port housing 111 in a direction parallel to the center axis of the port housing 111.

The port pinion 142 controls the motion of the port rack 141 within the port housing 111. The port motor 113 rotates the port pinion 142. The port pinion 142 holds the port rack 141 in position when the port motor 113 is not rotating the port rack 141. The port pinion 142 is a disk-shaped gear that meshes with the port rack 141.

The port jib 143 attaches to the port rack 141. The port jib 143 is a shaft that attaches to the port rack 141 in the manner of a cantilever. The port jib 143 projects perpendicularly from the center axis of the port rack 141. The port jib 143 projects beyond the exterior surface of the port housing 111 such that the port jib 143 attaches to the port side of the loading platform 103. The port inferior hinge 115 attaches the port jib 143 to the loading platform 103 such that the loading platform 103 rotates relative to the port structure 101.

The port tether 144 is a cord that attaches the loading platform 103 to the port housing 111. The port tether 144 tethers the loading platform 103 to the port housing 111 such that the motion of the loading platform 103 can be limited for safety purposes.

The port motor 113 is an electric motor. This disclosure assumes that a motor controller is provisioned with the port motor 113 to control the operation of the port motor 113. The port motor 113 attaches to the port pinion 142 of the port rack and pinion 112 such that the rotation of the port motor 113 rotates the port pinion 142. The selection and use of an electric motor for use as a port motor 113 are well-known and documented in the electrical and mechanical arts. The rotation of the port pinion 142 raises and lowers the loading platform 103.

The port superior hinge 114 is a fastener with a rotating structure. The port superior hinge 114 attaches the port housing 111 to the tailgate 132 such that the position of the port housing 111 rotates relative to the tailgate 132. The port inferior hinge 115 is a fastener with a rotating structure. The port inferior hinge 115 attaches to the port jib 143 such that the loading platform 103 rotates relative to the port housing 111 when the loading platform 103 attaches to the port jib 143.

The starboard structure 102 is a mechanical device. The starboard structure 102 is an electrically powered device.

The starboard structure 102 draws electrical power from the electrical system of the pickup truck 104. The starboard structure 102 mounts on the starboard side of the tailgate 132 of the pickup truck 104. The starboard structure 102 mounts on the starboard side of the tailgate 132 such that the starboard structure 102 is contained within the bed 131 of the tailgate 132. The starboard structure 102 rotates relative to the tailgate 132 between a position parallel to the interior face of the closed tailgate 132 and a position perpendicular to the interior face of the tailgate 132. The starboard structure 102 attaches to the loading platform 103. The starboard structure 102 attaches the loading platform 103 to the tailgate 132. The starboard structure 102 mechanically raises and lowers the elevation of the port side of the loading platform 103.

The port structure 101 and the starboard structure 102 work in concert such that the loading platform 103 forms a consistently horizontal surface as the port structure 101 and the starboard structure 102 raise and lower the loading platform 103. Methods to coordinate the operation of the port structure 101 and the starboard structure 102 to maintain the loading platform 103 in a horizontal position are well-known and documented in the electrical and mechanical arts.

The starboard structure 102 comprises a starboard housing 121, a starboard rack and pinion 122, a starboard motor 123, a starboard superior hinge 124, and a starboard inferior hinge 125.

The starboard housing 121 attaches to the starboard side of the tailgate 132. The starboard housing 121 is a prism-shaped structure. The starboard housing 121 is a hollow structure. The starboard housing 121 is a rigid casing. The starboard housing 121 contains starboard rack and pinion 122. The starboard housing 121 is formed with all apertures and form factors necessary to starboard rack and pinion 122 to accommodate the use and operation of the starboard structure 102. The starboard motor 123 attaches to the exterior surface of the starboard housing 121. Methods to form a starboard housing 121 suitable for the purposes described in this disclosure are well-known and documented in the mechanical arts. The starboard housing 121 further comprises a starboard tether 154.

The starboard rack and pinion 122 is a well-known and documented mechanical structure. The starboard rack and pinion 122 is contained within the hollow structure formed by the starboard housing 121. The starboard rack and pinion 122 is a mechanical device that converts rotational motion into linear motion. The starboard rack and pinion 122 is configured such that the starboard rack and pinion 122 converts the rotational energy provided by the starboard motor 123 into linear motion that raises and lowers the starboard side of the loading platform 103. The operation of the starboard rack and pinion 122 is described in a definition provided elsewhere in this disclosure. The starboard rack and pinion 122 comprises a starboard rack 151 and a starboard pinion 152.

The starboard rack 151 forms the rack portion of the starboard rack and pinion 122. The starboard rack 151 is a toothed plate structure. The starboard rack 151 mounts within the starboard housing 121 such that the starboard rack 151 moves within the starboard housing 121 in a direction parallel to the center axis of the starboard housing 121.

The starboard pinion 152 controls the motion of the starboard rack 151 within the starboard housing 121. The starboard motor 123 rotates the starboard pinion 152. The starboard pinion 152 holds the starboard rack 151 in position when the starboard motor 123 is not rotating the starboard rack 151. The starboard pinion 152 is a disk-shaped gear that meshes with the starboard rack 151.

The starboard jib 153 attaches to the starboard rack 151. The starboard jib 153 is a shaft that attaches to the starboard rack 151 in the manner of a cantilever. The starboard jib 153 projects perpendicularly from the center axis of the starboard rack 151. The starboard jib 153 projects beyond the exterior surface of the starboard housing 121 such that the starboard jib 153 attaches to the starboard side of the loading platform 103. The starboard inferior hinge 125 attaches the starboard jib 153 to the loading platform 103 such that the loading platform 103 rotates relative to the starboard structure 102.

The starboard tether 154 is a cord that attaches the loading platform 103 to the starboard housing 121. The starboard tether 154 tethers the loading platform 103 to the starboard housing 121 such that the motion of the loading platform 103 can be limited for safety purposes.

The starboard motor 123 is an electric motor. This disclosure assumes that a motor controller is provisioned with the starboard motor 123 to control the operation of the starboard motor 123. The starboard motor 123 attaches to the starboard pinion 152 of the starboard rack and pinion 122 such that the rotation of the starboard motor 123 rotates the starboard pinion 152. The rotation of the starboard pinion 152 raises and lowers the loading platform 103. The selection and use of an electric motor for use as a starboard motor 123 are well-known and documented in the electrical and mechanical arts.

The starboard superior hinge 124 is a fastener with a rotating structure. The starboard superior hinge 124 attaches the starboard housing 121 to the tailgate 132 such that the position of the starboard housing 121 rotates relative to the tailgate 132. The starboard inferior hinge 125 is a fastener with a rotating structure. The starboard inferior hinge 125 attaches to the starboard jib 153 such that the loading platform 103 rotates relative to the starboard housing 121 when the loading platform 103 attaches to the starboard jib 153.

The port structure 101, the starboard structure 102, and the loading platform 103 collapse into a storage position by: a) rotating the load bearing face of the loading platform 103 to a position parallel to the center axes of the port structure 101 and the starboard structure 102; and subsequently, b) rotating the structure formed by the combination of the port structure 101, the starboard structure 102, and the loading platform 103 into a position such that the center axes of the port structure 101 and the starboard structure 102 are parallel to the interior face of the tailgate 132.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Beam: As used in this disclosure, a beam is a horizontally oriented shaft that: 1) is suspended above a supporting surface; and, 2) bears a load.

Bow: As used in this disclosure, the bow refers to the anterior side of an object, vehicle, or vessel. Specifically, the bow refers to the most forward element of the object in the direction of the primary sense of direction of the object vehicle, or vessel.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cargo: As used in this disclosure, cargo refers to one or more objects that are intended to be transported using a vehicle.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Closed Position: As used in this disclosure, a closed position refers to a movable barrier structure that is in an orientation that prevents passage through a port or an aperture. The closed position is often referred to as an object being "closed." Always use orientation.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggests otherwise, the specified horizontal surface is the supporting surface the potential embodiment of the disclosure rests on. The infinitive form of elevation is to elevate.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern Gear: As used in this disclosure, a gear is a toothed wheel, cylinder, or other toothed mechanical element that is used to transmit motion, a change of speed, or a change of direction to second toothed wheel, cylinder, or other toothed mechanical element.

Ground: As used in this disclosure, the ground is a solid supporting surface formed by the Earth. The term level ground means that the supporting surface formed by the ground is roughly perpendicular to the force of gravity.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid casing that encloses and protects one or more devices.

Inferior: As used in this disclosure, the term inferior refers to a directional reference that is parallel to and in the same direction as the force of gravity when an object is positioned or used normally.

Jib: As used in this disclosure, a jib is a beam structure that: 1) is mounted with a free end in the manner of a cantilever; and, 2) suspends a load at the free end of the jib. In multicomponent beam structures, such as with a crane, the jib is the sub-structure that physically suspends the load.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs which are used determine the desired rotational speed and direction of rotation of the electric motor.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, a right sidewall, and an end wall.

Pivot: As used in this disclosure, a pivot is a rod or shaft around which an object rotates or swings.

Plate: As used in this disclosure, a plate is a smooth, flat and semi-rigid or rigid structure that has at least one dimension that: a) is of uniform thickness; and b) that appears thin relative to the other dimensions of the object. Plates are often disks. The face of the plate is a surface of the plate selected from the group consisting of: a) the surface of the plate with the greatest surface area; b) the surface of the plate that is distal from the surface of the plate with the greatest surface area. The edges of the plate comprises the surfaces of the plate that would not be considered faces as defined above. As defined in this disclosure, plates may be made of any material, but are commonly made of metal, plastic, and wood. When made of wood, a plate is often referred to as a board.

Platform: As used in this disclosure, a platform is a raised horizontal surface that forms a load path to support objects placed on the superior surface of the platform.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rack and Pinion: As used in this disclosure, a rack and pinion is a gearing system that is designed to convert rotational energy into linear energy or the reverse. The rack is a toothed shaft that moves in a linear manner. The pinion is a gear (generally mounted on a rotating shaft) that interacts with the rack such that when the pinion rotates the rack is moved in a linear direction. Reversing the direction of rotation of the pinion will reverse the direction of the rack. Rack and pinion systems are well known and documented in the mechanical arts.

Rigid Structure: As used in this disclosure, a rigid structure is a solid structure formed from an inelastic material that resists changes in shape. A rigid structure will permanently deform as it fails under a force.

Roughly: As used in this disclosure, roughly refers to a comparison between two objects. Roughly means that the difference between one or more parameters of the two compared are not significantly different.

Shaft: As used in this disclosure, a shaft is a long, narrow and rigid prism structure that is used as: 1) a structural element of a larger object; or 2) as a grip or lever for a handle. Shafts often have a cylindrical shape.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Tailgate: As used in this disclosure, a tailgate is a hinged door mounted on the stern of a pickup truck that can be lowered or removed in order to facilitate loading of the pickup truck.

Teeth: As used in this disclosure, the teeth refer to a plurality of working elements of a tool that interact with a pawl or with other teeth to perform the function of the tool. The teeth found on gears is a common example of the use of teeth. An individual working element selected from the plurality of working elements is called a tooth.

Vehicle: As used in this disclosure, a vehicle is a motorized device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Figure 1:
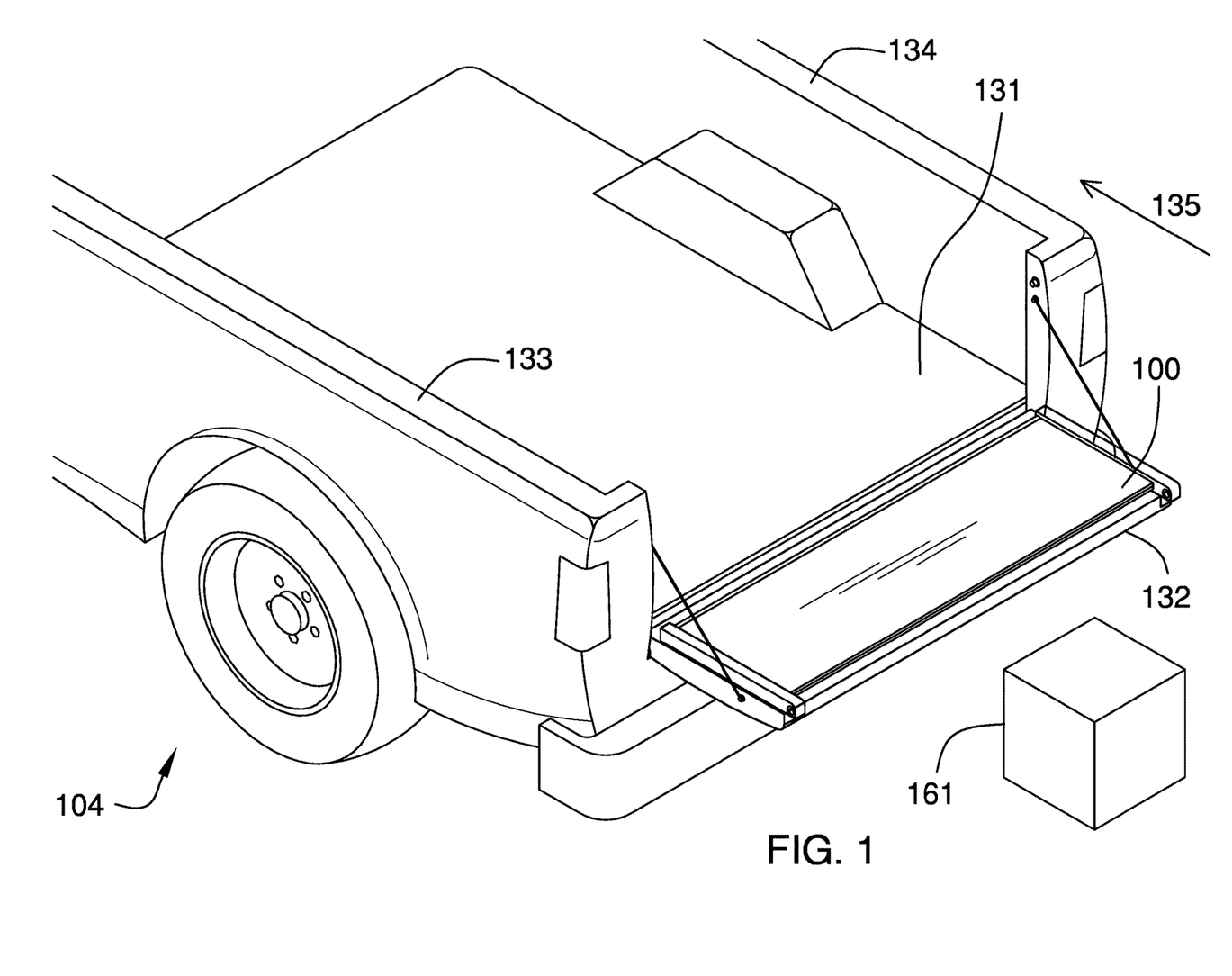
FIG. 1 is a perspective view of an embodiment of the disclosure.
Figure 2:
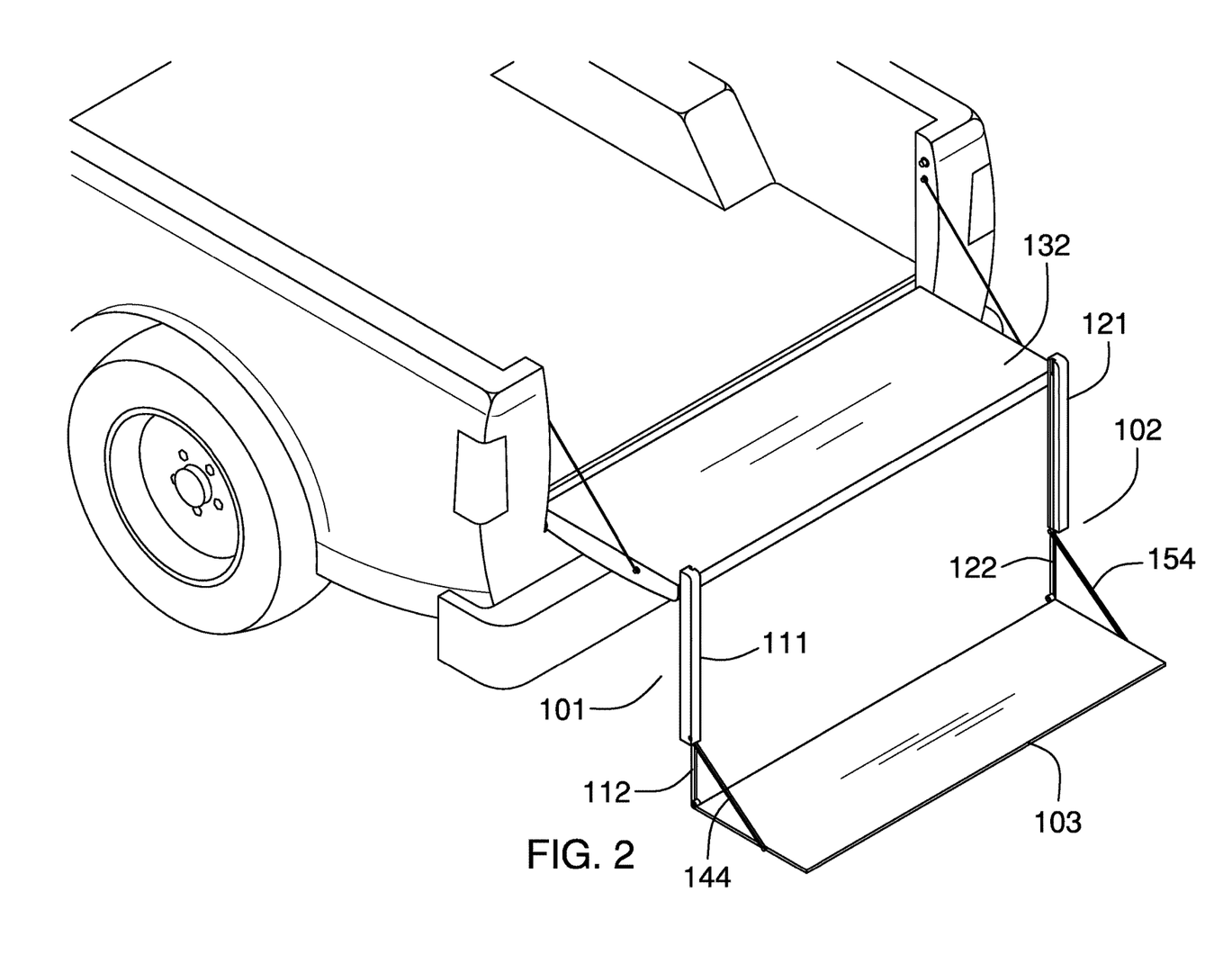
FIG. 2 is a perspective in-use view of an embodiment of the disclosure.
Figure 3:
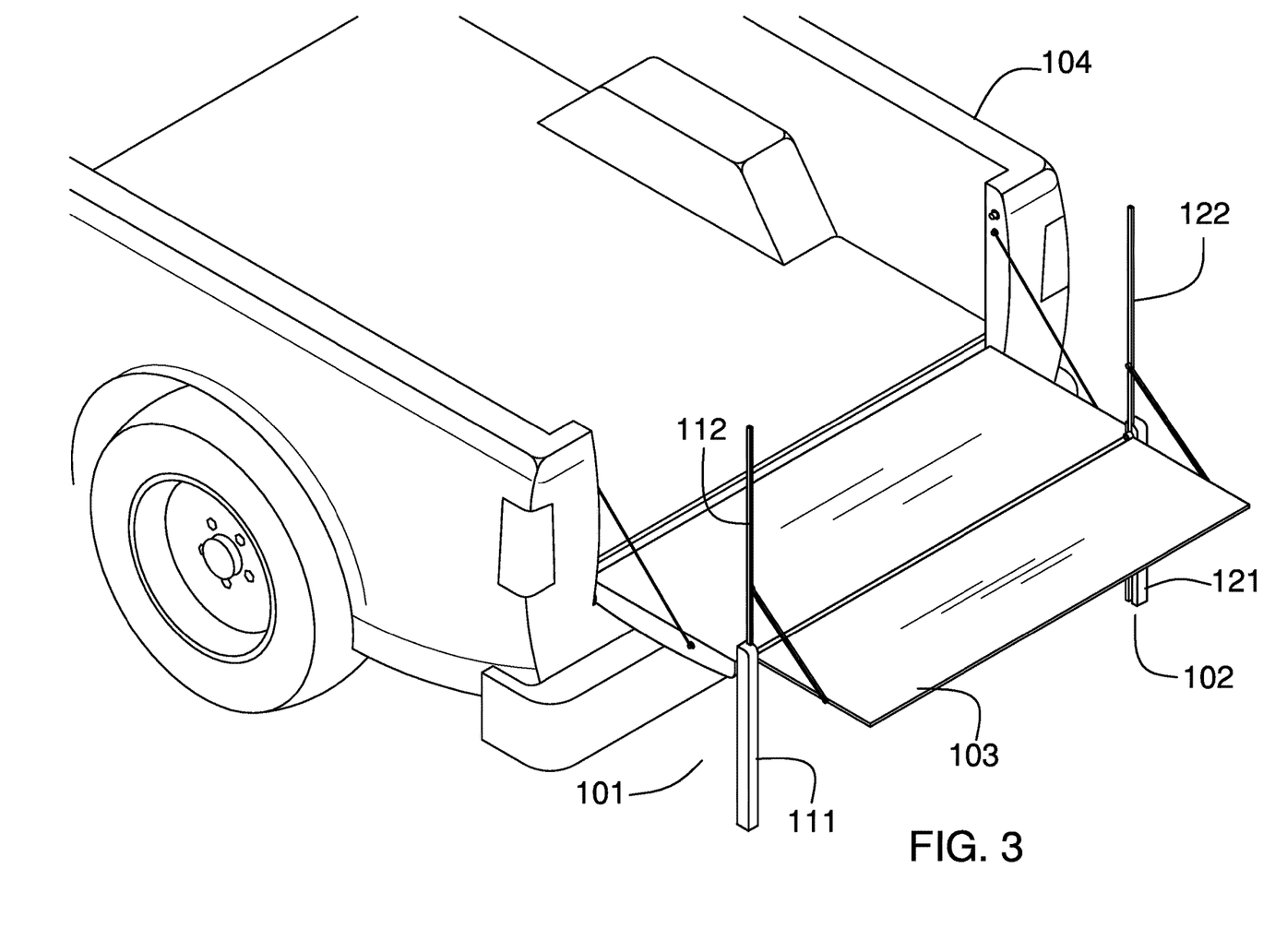
FIG. 3 is a perspective in-use view of an embodiment of the disclosure.
Figure 4:
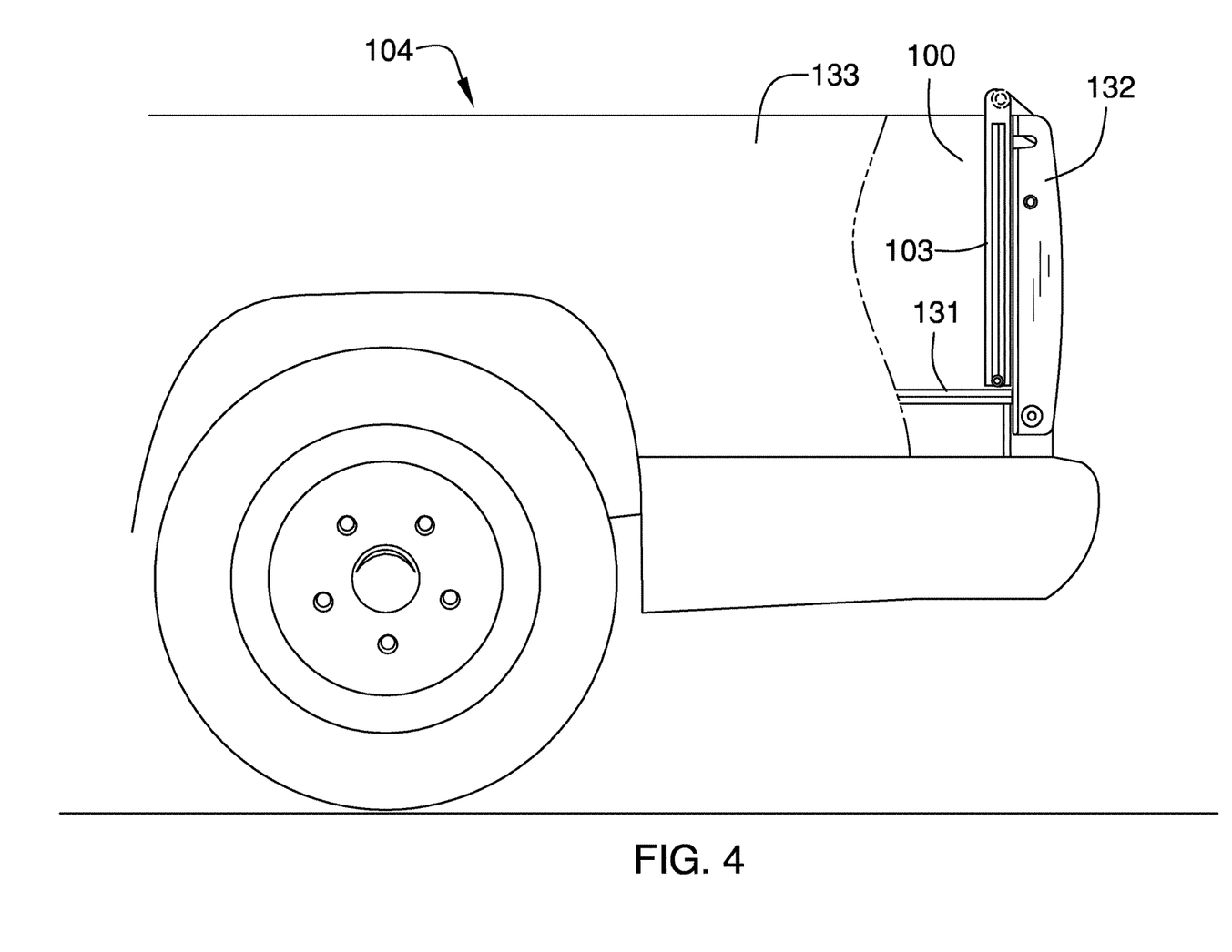
FIG. 4 is a lateral view of an embodiment of the disclosure.
Figure 5:
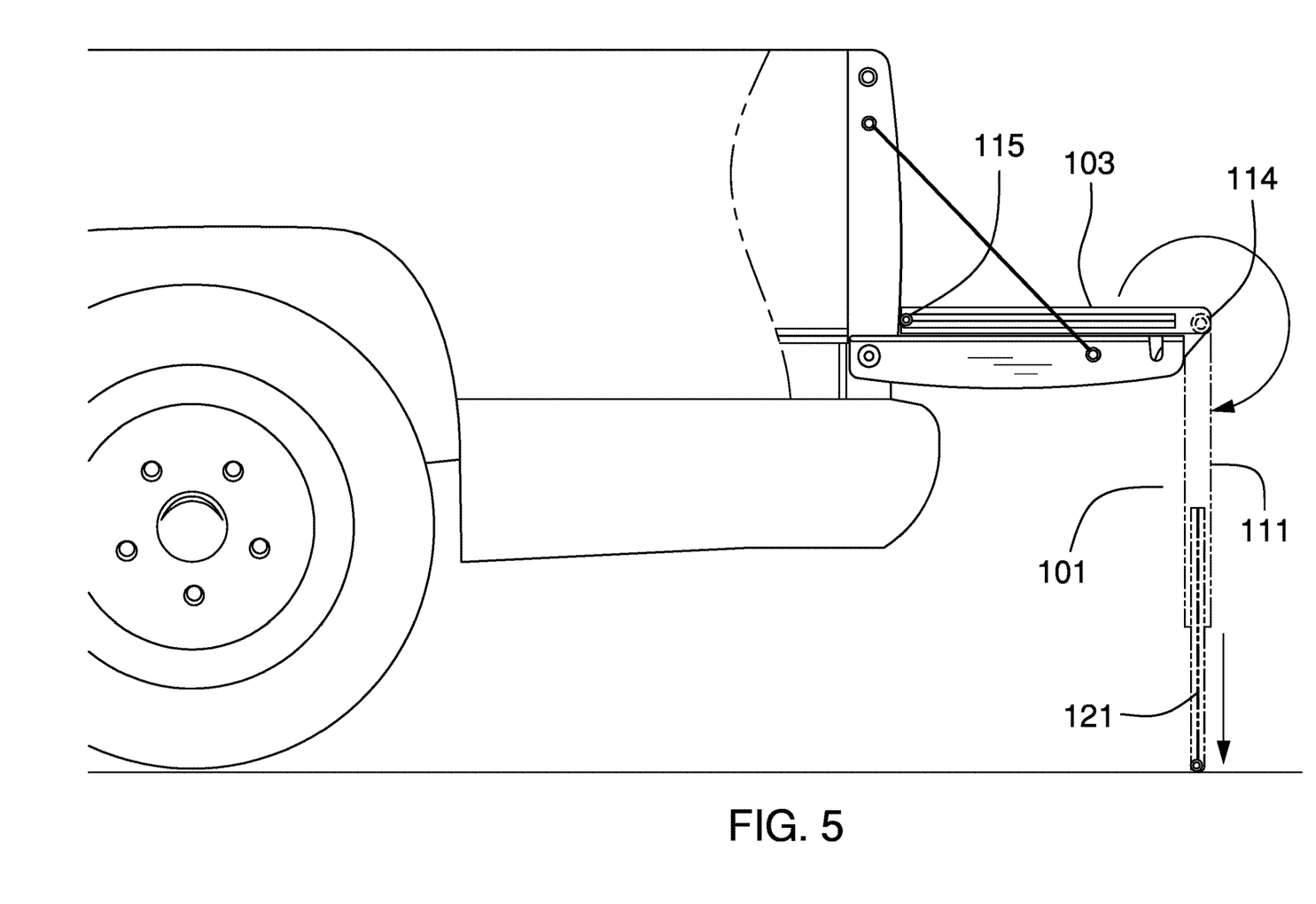
FIG. 5 is a lateral in-use view of an embodiment of the disclosure.
Figure 6:
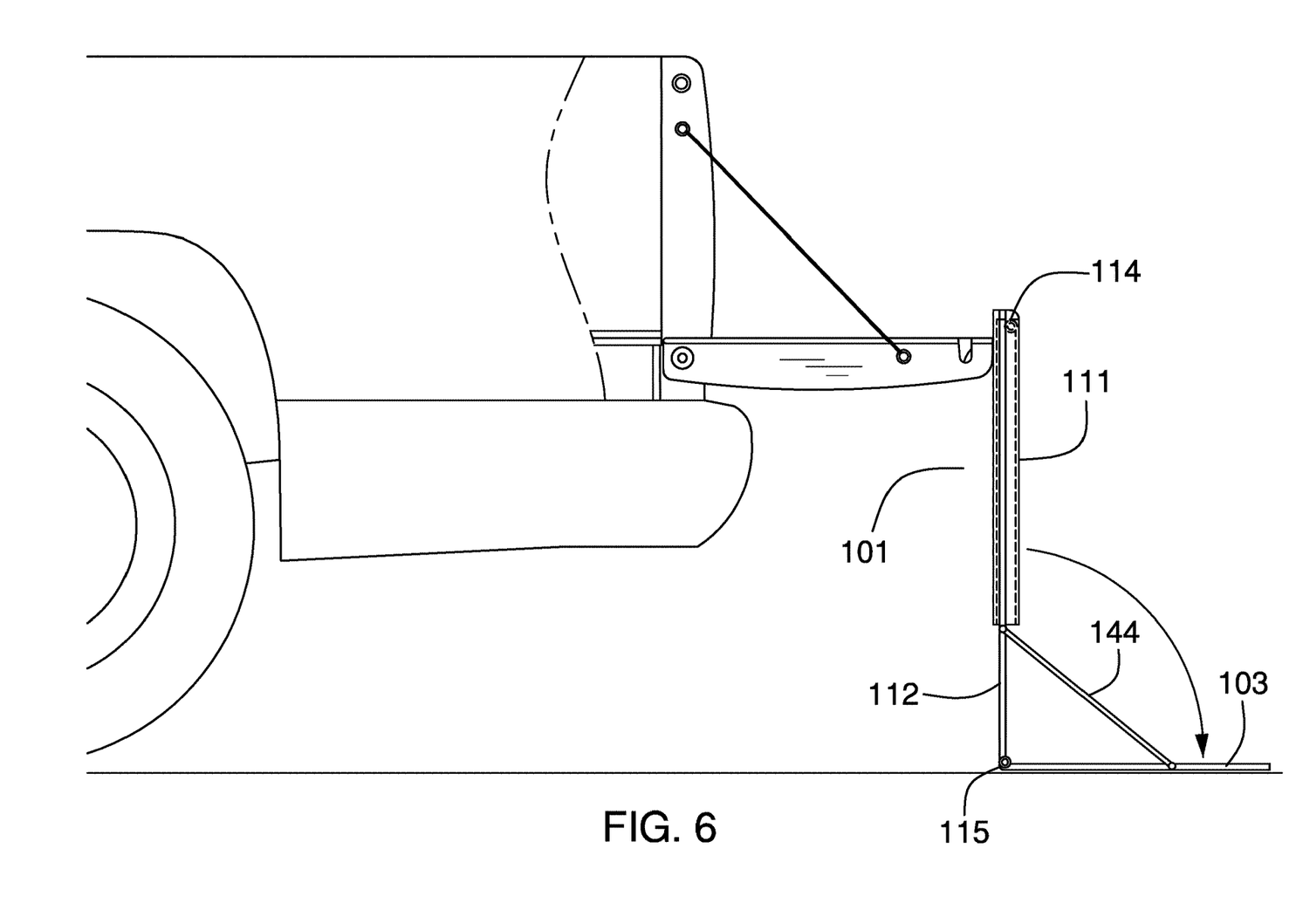
FIG. 6 is a lateral in-use view of an embodiment of the disclosure.
Figure 7:
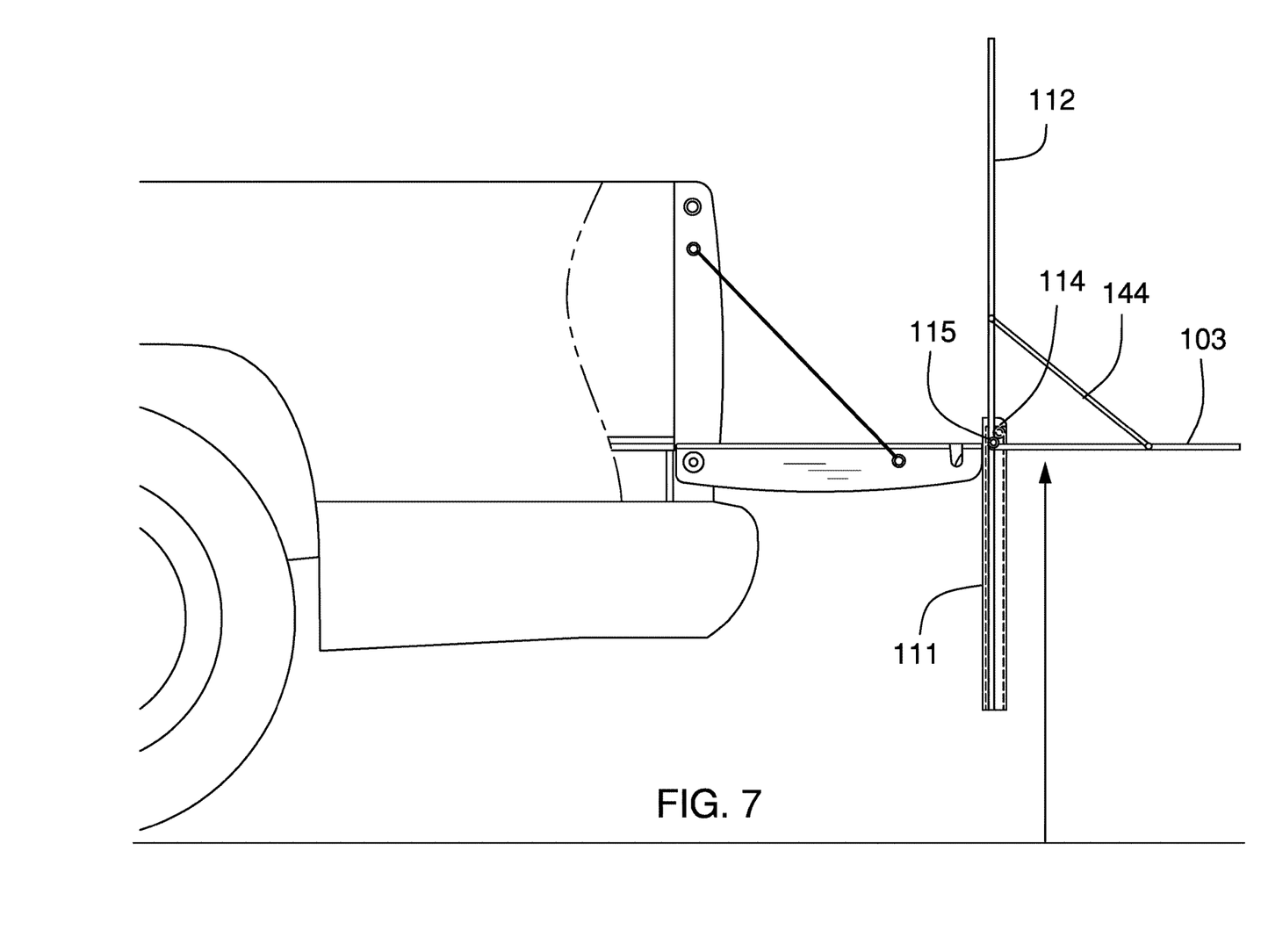
FIG. 7 is a lateral in-use view of an embodiment of the disclosure.
Figure 8:
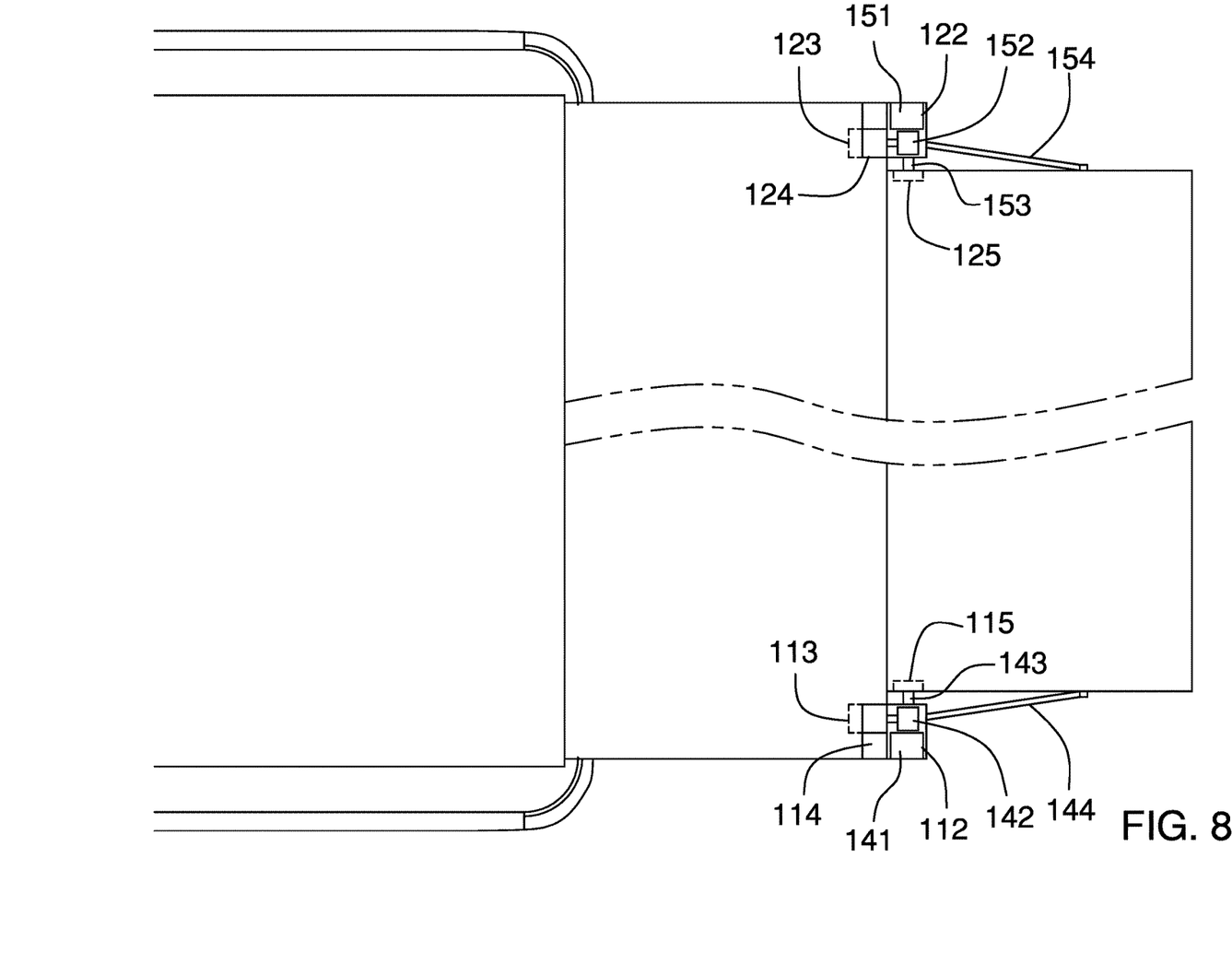
FIG. 8 is a superior detail view of an embodiment of the disclosure.
Figure 9:
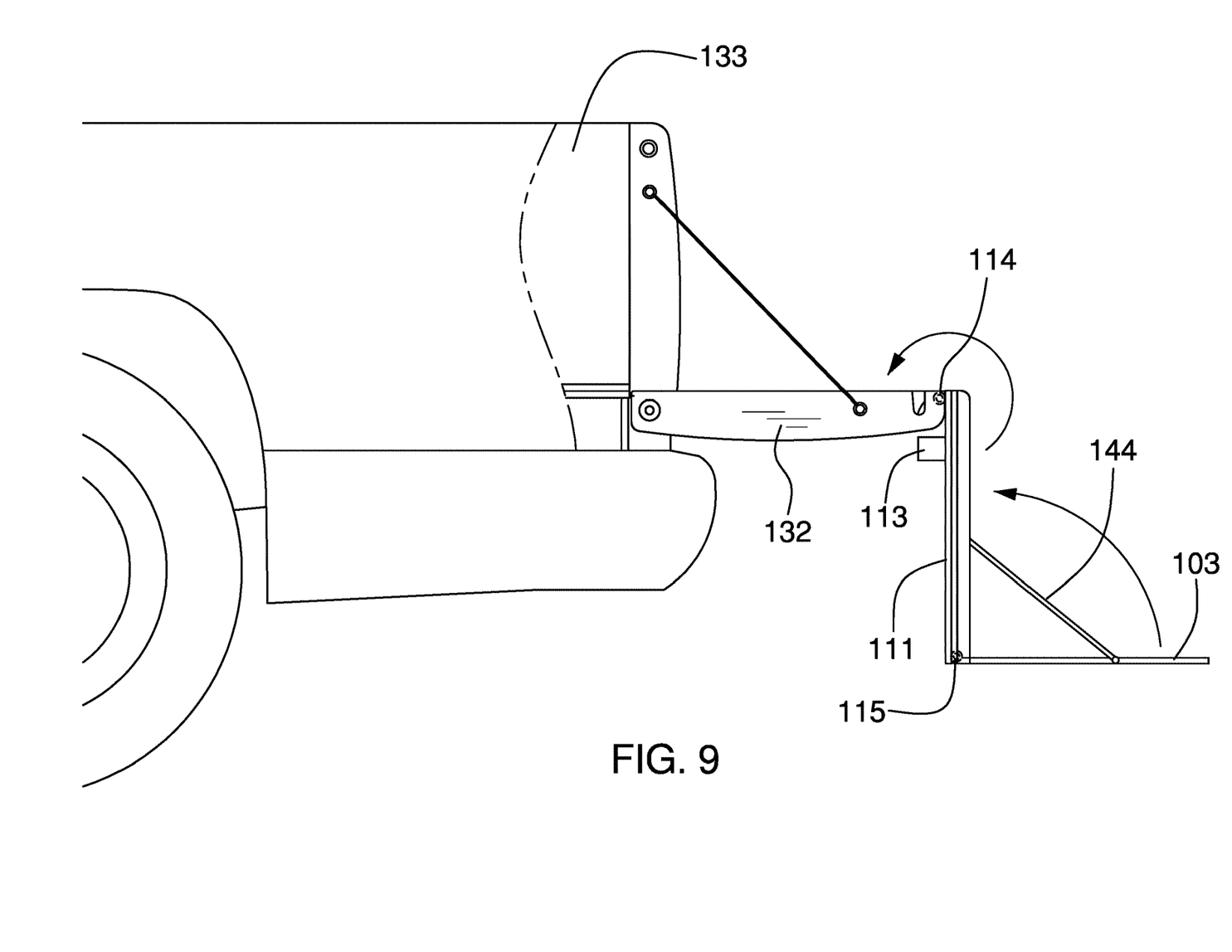
FIG. 9 is a lateral detail view of an embodiment of the disclosure.
Figure 10:
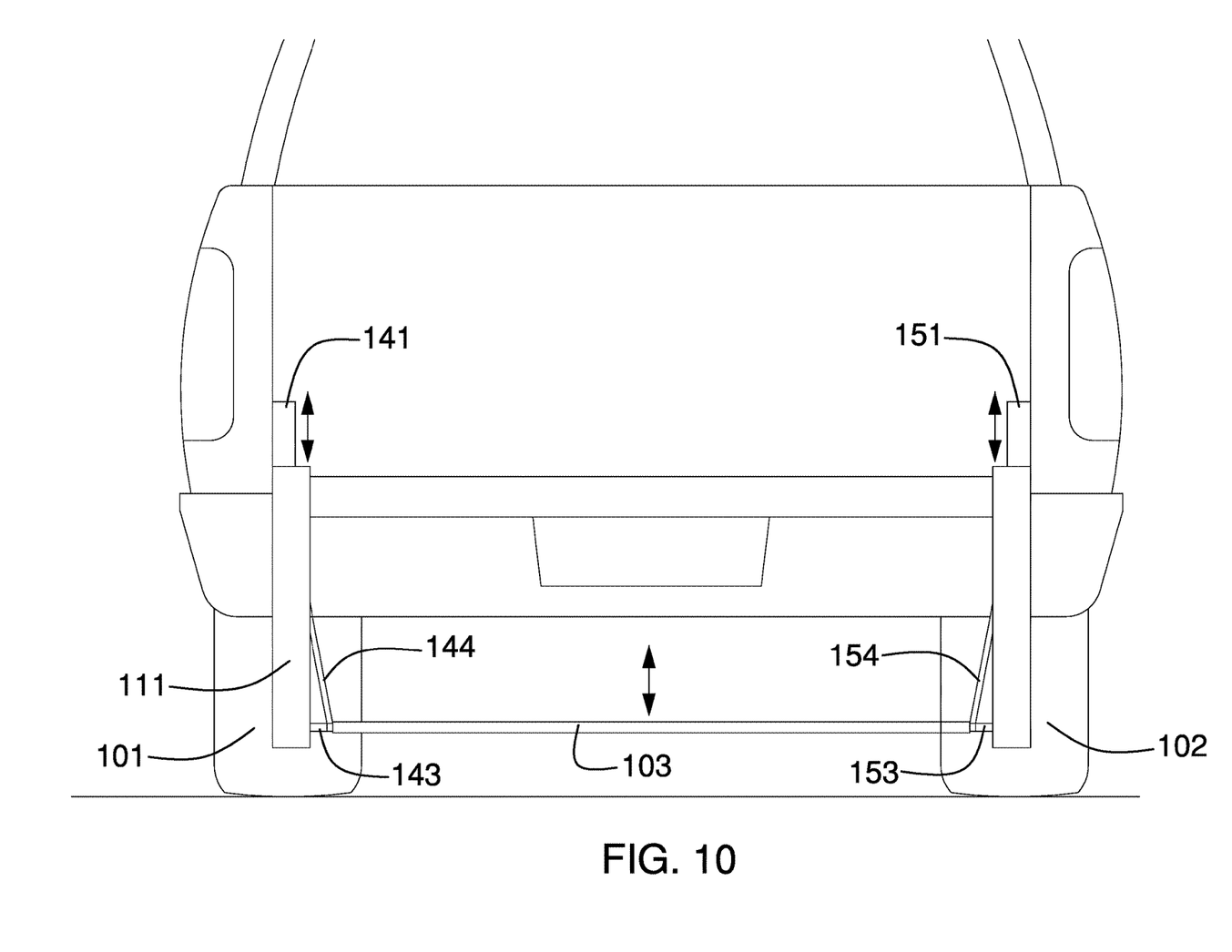
FIG. 10 is a posterior detail view of an embodiment of the disclosure.

With respect to the above description, it is to be realized that the optimum dimensional relationship for the various components of the invention described above and in FIGS. 1 through 10 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A loading lift for a tailgate comprising
a port structure, a starboard structure, and a loading platform;
wherein the loading platform attaches to the port structure and the starboard structure;
wherein the loading lift is configured for use with a pickup truck;
wherein the port structure is configured to mount on a tailgate of the pickup truck;
wherein the starboard structure is configured to mount on the tailgate of the pickup truck;
wherein the loading lift for a tailgate is a moving platform;
wherein the loading lift for a tailgate is configured for use with cargo;
wherein the port structure comprises a port housing, a port rack and pinion, a port motor, a port superior hinge, and a port inferior hinge;
wherein the port housing is a rigid casing;
wherein the port housing is a prism-shaped structure;
wherein the port housing is a hollow structure;
wherein the port housing contains port rack and pinion;
wherein the port motor attaches to the exterior surface of the port housing;
wherein the port superior hinge is a fastener with a rotating structure;
wherein the port inferior hinge is a fastener with a rotating structure;
wherein the starboard structure comprises a starboard housing, a starboard rack and pinion, a starboard motor, a starboard superior hinge, and a starboard inferior hinge;
wherein the starboard housing is a rigid casing;
wherein the starboard housing is a prism-shaped structure;
wherein the starboard housing is a hollow structure;
wherein the starboard housing contains starboard rack and pinion;
wherein the starboard motor attaches to the exterior surface of the starboard housing;
wherein the starboard superior hinge is a fastener with a rotating structure;
wherein the starboard inferior hinge is a fastener with a rotating structure;
wherein the port superior hinge attaches the port housing to the tailgate such that the position of the port housing rotates relative to the tailgate;
wherein the port inferior hinge attaches to a port jib such that the loading platform rotates relative to the port housing when the loading platform attaches to the port jib;
wherein the port inferior hinge attaches the port jib to the loading platform such that the loading platform rotates relative to the port structure;
wherein the starboard superior hinge attaches the starboard housing to the tailgate such that the position of the starboard housing rotates relative to the tailgate;
wherein the starboard inferior hinge attaches to a starboard jib such that the loading platform rotates relative to the starboard housing when the loading platform attaches to the starboard jib;
wherein the starboard inferior hinge attaches the starboard jib to the loading platform such that the loading platform rotates relative to the starboard structure.

2. The loading lift for a tailgate according to claim 1
wherein the loading lift for a tailgate is configured for use as a cargo lift;
wherein the port structure and the starboard structure vertically raise and lower the loading platform;
wherein the cargo is placed on the loading platform.

3. The loading lift for a tailgate according to claim 2
wherein the loading platform is a horizontal plate;
wherein the loading platform rotates relative to the port structure and the starboard structure.

4. The loading lift for a tailgate according to claim 3
wherein the port structure is a mechanical device;
wherein the port structure is an electrically powered device;
wherein the port structure mounts on the port side of the tailgate of the pickup truck;
wherein the port structure mounts on the port side of the tailgate such that the port structure is contained within a bed of the closed tailgate of the pickup truck;
wherein the port structure attaches the loading platform to the tailgate.

5. The loading lift for a tailgate according to claim 4
wherein the starboard structure is a mechanical device;
wherein the starboard structure is an electrically powered device;
wherein the starboard structure mounts on the starboard side of the tailgate of the pickup truck;
wherein the starboard structure mounts on the starboard side of the tailgate such that the starboard structure is contained within the bed of the closed tailgate;
wherein the starboard structure attaches the loading platform to the tailgate.

6. The loading lift for a tailgate according to claim 5
wherein the load bearing face of the loading platform rotates between a position parallel to the center axis of the port housing of the port structure to a position perpendicular to the center axis of the port housing of the port structure.

7. The loading lift for a tailgate according to claim 6
wherein the port rack and pinion is a mechanical structure;
wherein the port rack and pinion is contained within the hollow structure formed by the port housing;
wherein the port rack and pinion is a mechanical device that converts rotational motion into linear motion;
wherein the port rack and pinion is configured such that the port rack and pinion converts the rotational energy provided by the port motor into linear motion that raises and lowers the port side of the loading platform.

8. The loading lift for a tailgate according to claim 7
wherein the starboard rack and pinion is a mechanical structure;
wherein the starboard rack and pinion is contained within the hollow structure formed by the starboard housing;

wherein the starboard rack and pinion is a mechanical device that converts rotational motion into linear motion;

wherein the starboard rack and pinion is configured such that the starboard rack and pinion converts the rotational energy provided by the starboard motor into linear motion that raises and lowers the starboard side of the loading platform.

9. The loading lift for a tailgate according to claim 8 wherein the port rack and pinion comprises a port rack and a port pinion;

wherein the port pinion controls the motion of the port rack;

wherein the starboard rack and pinion comprises a starboard rack and a starboard pinion;

wherein the starboard pinion controls the motion of the starboard rack.

10. The loading lift for a tailgate according to claim 9 wherein the port rack forms the rack portion of the port rack and pinion;

wherein the port rack is a toothed plate structure;

wherein the port rack mounts within the port housing such that the port rack moves within the port housing in a direction parallel to the center axis of the port housing.

11. The loading lift for a tailgate according to claim 10 wherein the starboard rack forms the rack portion of the starboard rack and pinion;

wherein the starboard rack is a toothed plate structure;

wherein the starboard rack mounts within the starboard housing such that the starboard rack moves within the starboard housing in a direction parallel to the center axis of the starboard housing.

12. The loading lift for a tailgate according to claim 11 wherein the port pinion controls the motion of the port rack within the port housing;

wherein the port pinion is a disk-shaped gear that meshes with the port rack;

wherein the port motor rotates the port pinion;

wherein the port pinion holds the port rack in position when the port motor is not rotating the port rack.

13. The loading lift for a tailgate according to claim 12 wherein the starboard pinion controls the motion of the starboard rack within the starboard housing;

wherein the starboard pinion is a disk-shaped gear that meshes with the starboard rack;

wherein the starboard motor rotates the starboard pinion;

wherein the starboard pinion holds the starboard rack in position when the starboard motor is not rotating the starboard rack.

14. The loading lift for a tailgate according to claim 13 wherein port jib attaches to the port rack;

wherein the port jib is a shaft that attaches to the port rack in the manner of a cantilever;

wherein the port jib projects perpendicularly from the center axis of the port rack;

wherein the port jib projects beyond the exterior surface of the port housing such that the port jib attaches to the port side of the loading platform.

15. The loading lift for a tailgate according to claim 14 wherein starboard jib attaches to the starboard rack;

wherein the starboard jib is a shaft that attaches to the starboard rack in the manner of a cantilever;

wherein the starboard jib projects perpendicularly from the center axis of the starboard rack;

wherein the starboard jib projects beyond the exterior surface of the starboard housing such that the starboard jib attaches to the starboard side of the loading platform.

16. The loading lift for a tailgate according to claim 15 wherein the port motor is an electric motor;

wherein the port motor attaches to the port pinion of the port rack and pinion such that the rotation of the port motor rotates the port pinion;

wherein the rotation of the port pinion raises and lowers the loading platform.

17. The loading lift for a tailgate according to claim 16 wherein the starboard motor is an electric motor;

wherein the starboard motor attaches to the starboard pinion of the starboard rack and pinion such that the rotation of the starboard motor rotates the starboard pinion;

wherein the rotation of the starboard pinion raises and lowers the loading platform.

* * * * *